United States Patent
Sugimoto et al.

(10) Patent No.: US 7,422,808 B2
(45) Date of Patent: Sep. 9, 2008

(54) VERTICAL MAGNETIC RECORDING MEDIUM, MAGNETIC RECORDING APPARATUS AND MANUFACTURING METHOD OF A VERTICAL MAGNETIC RECORDING MEDIUM

(75) Inventors: Toshio Sugimoto, Kawasaki (JP); Takuya Uzumaki, Kawasaki (JP); Atsushi Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 290 days.

(21) Appl. No.: 10/938,259

(22) Filed: Sep. 10, 2004

(65) Prior Publication Data
US 2005/0233178 A1 Oct. 20, 2005

(30) Foreign Application Priority Data
Apr. 14, 2004 (JP) .............................. 2004-119273

(51) Int. Cl.
*G11B 5/667* (2006.01)
(52) U.S. Cl. ..................... 428/828.1; 428/829; 360/131
(58) Field of Classification Search ........................ None
See application file for complete search history.

(56) References Cited

U.S. PATENT DOCUMENTS

| | | | |
|---|---|---|---|
| 6,682,826 B2 * | 1/2004 | Shimizu et al. | 428/828 |
| 6,890,667 B1 * | 5/2005 | Lairson et al. | 428/611 |
| 7,067,207 B2 * | 6/2006 | Kamata et al. | 428/836 |
| 7,141,317 B2 | 11/2006 | Kikitsu et al. | |
| 7,147,790 B2 * | 12/2006 | Wachenschwanz et al. | 216/22 |
| 2004/0009375 A1 * | 1/2004 | Tanahashi et al. | 428/695 |
| 2005/0019608 A1 * | 1/2005 | Kim et al. | 428/694 BS |
| 2007/0015011 A1 | 1/2007 | Kikitsu et al. | |
| 2007/0041306 A1 * | 2/2007 | Wachenschwanz et al. | 369/272.1 |

FOREIGN PATENT DOCUMENTS

| | | |
|---|---|---|
| JP | 2002-208129 | 7/2002 |
| JP | 2003-016621 | 1/2003 |
| JP | 2003-016622 | 1/2003 |
| JP | 2003-228809 | 8/2003 |
| JP | 2004-118956 | 4/2004 |

* cited by examiner

*Primary Examiner*—Kevin M Bernatz
(74) *Attorney, Agent, or Firm*—Greer, Burns & Crain, Ltd.

(57) ABSTRACT

A vertical magnetic recording medium includes a substrate, a soft magnetic backing layer formed on the substrate, a magnetic flux confinement layer formed on the soft magnetic backing layer, an intermediate layer formed on the magnetic flux confinement layer, and a recording layer of a vertical magnetization film formed on the intermediate layer. The magnetic flux confinement layer has a plurality of soft magnetic parts each formed along a track region of plural track regions and a non-magnetic parts formed between adjacent track regions. The intermediate layer is formed of a non-magnetic material and is formed so as to cover a surface of the soft magnetic part and the non-magnetic parts.

9 Claims, 11 Drawing Sheets

VERTICAL MAGNETIC RECORDING MEDIUM, MAGNETIC RECORDING APPARATUS AND MANUFACTURING METHOD OF A VERTICAL MAGNETIC RECORDING MEDIUM

CROSS-REFERENCE TO RELATED APPLICATION

The present application is based on Japanese priority application No. 2004-119273 filed on Apr. 14, 2004, the entire contents of which are hereby incorporated by reference.

BACKGROUND OF THE INVENTION

The present invention generally relates to vertical magnetic recording medium, magnetic storage apparatus and manufacturing method of a vertical magnetic recording medium, and more particularly to a vertical magnetic recording medium having a layer confining a magnetic flux between a substrate and a recording layer.

In recent years, the magnetic storage apparatuses used for personal computers or home movie recording apparatuses generally have a large storage capacity of 100 GB or more in relation to the need of recording motion pictures. Further, it is predicted that the demand of larger storage capacity and reduced cost of the magnetic disk apparatuses becomes more stringent in the future.

In the in-plane magnetic recording technology used in the currently marketed magnetic disk apparatuses, it is recognized that the surface recording density of 200 Gbit/inch$^2$ is the maximum recording density achievable with this conventional technology.

As the magnetic recording technology that can break through this technological limit, the technology of vertical magnetic recording draws attention again, in view of the nature of the vertical magnetic recording technology that can reduce the effect of the demagnitization field formed by the magnetization of the magnetic recording layer. With the vertical magnetic recording technology, it is predicted that the recording density of 1 Tbit/inch$^2$ or more is achieved.

With the vertical magnetic recording technology, however, problems noted below are pointed out.

First, with decrease of the track width, there occurs a decrease of core width in the magnetic pole of the magnetic head, and the recoding magnetic field formed with the magnetic head is reduced.

Second, there is a tendency that the magnetic flux spreads laterally in the magnetic recording medium located downward of the magnetic pole of the magnetic head at the time of the magnetic recording, and there arises a problem of so-called side erasing or side writing, in which the information in the adjacent track is erased.

Third, there occurs increase of medium noise of the recording layer with increase of linear recording density, wherein this increase of the medium noise is attributed mostly to the noise formed in the magnetization transition region (transition noise).

Fourth, it is difficult to control the core width and position of the magnetic pole in the recording head and the reproducing head.

Particularly, the foregoing second problem appears conspicuous in the so-called two-layer vertical magnetic recording medium having a soft magnetic backing layer between the substrate and the recording layer. It should be noted that this two-layer vertical magnetic recording medium is thought as a promising recording medium capable of realizing a high density recording.

More specifically, there occurs a decrease of recording magnetic field in such a two-layer vertical magnetic recording medium as a result of the spreading of the magnetic flux as the magnetic flux exiting from the end point of the miniaturized single pole magnetic head extends toward the soft magnetic backing layer covering the entire magnetic disk surface, and there occurs an increase of side erasing phenomenon or increase of length of the magnetic transition region in the recording layer along the track direction.

In view of the foregoing, there is a proposal of providing a region underneath the track formed magnetically in the recording layer so as to guide the magnetic flux toward the soft magnetic backing layer and suppress the spreading of the magnetic flux at the time of the recording (reference should be made to Patent References 1 and 2).

FIG. 1 shows such a vertical magnetic recording medium 100 described in the foregoing Patent Reference 2.

Referring to FIG. 1, the vertical magnetic recording medium 100 includes a soft magnetic backing layer 102 between a substrate 101 and a recording layer 103, wherein there is provided a soft magnetic part 102a in the soft magnetic backing layer 102 along a track region 103a, along which magnetic recording of information is made into the recording layer 103, such that the magnetic flux is guided preferentially to the soft magnetic backing layer 102 along such a soft magnetic part 102a. Further, there is formed a non-magnetic part 102c along an inter-track region 103b formed between a pair of adjacent track regions 103a such that penetration of the magnetic flux into such a inter-track region 103b is reduced. Thereby, the magnetic flux from the magnetic pole of the magnetic head is concentrated to the soft magnetic part 102a of the soft magnetic backing layer 102 after passing through the recording layer 103, and thus, the problem of lateral spreading of the magnetic flux and associated side-erasing of the information are suppressed.

Patent Reference 1 Japanese Laid Open Patent Application 2003-16621 official gazette Patent Reference 2 Japanese Laid Open Patent Application 2003-16622 official gazette

SUMMARY OF THE INVENTION

It should be noted that the recording layer of a vertical magnetic recording medium is formed of a polycrystalline material in which the crystal grains are physically separated from each other by a non-magnetic grain boundary part. In the case the recording layer is formed of a CoCr alloy, for example, the crystal grains grow under the influence of the underlying surface of the recording layer, in other words under the influence of the crystal structure at the surface part of the soft magnetic backing layer, such that the c-axis of the CoCr alloy is aligned generally in the direction perpendicular to the substrate.

With regard to the vertical magnetic recording medium of FIG. 1, the Patent Reference 2 teaches to provide a crystal alignment control layer 102b on the soft magnetic part 102a for controlling the crystal alignment of the recording layer 103 (particularly the tracking region 103a) formed on the crystal orientation control layer 102b, such that excellent magnetic characteristics are realized. Further, the Patent Reference 2 teaches that the recording layer 103 formed on the non-magnetic part 102c (an inter-track region 103b) may have poor magnetic characteristics.

On the other hand, when the recording layer 103 is formed on a underlying surface that includes regions of different materials or different crystal structures, there is a tendency that there occurs non-uniform growth of crystal grains in the recording layer 103 or formation of cracks in the crystal grains, while this can lead to increased degree of variation of crystal grains or increased non-uniformity of internal stress in the recording layer 103. It should be noted that such a problem can occur particularly in the vicinity of the boundary between the track region 103a and the inter-track region 103b of the magnetic layer 103. When such increase of non-uniformity or strain occurs in the recording layer 103, there is caused medium noise at the time of playback of the information, and the signal-to-noise ratio (S/N) is deteriorated.

The present invention has been made in view of the foregoing problems and has its object of providing a vertical magnetic recording medium capable or realizing high recording density in which side erasing is suppressed and the S/N ratio is improved, by suppressing the spreading of the magnetic flux exiting from a magnetic head and a magnetic storage apparatus using such a vertical magnetic recording medium. Further, the present invention provides the manufacturing method of such a vertical magnetic recording medium.

According to a first aspect of the present invention, there is provided a vertical magnetic recording medium having a recording layer including a track region recorded with information by a magnetic head and an inter-track region separating said track region from an adjacent track region offset in position from said track region in a width direction thereof, said track region and said inter-track region being formed magnetically in said magnetic recording layer, said magnetic recording medium comprising:

a substrate;

a soft magnetic backing layer formed on said substrate;

a magnetic flux confinement layer formed on said soft magnetic backing layer;

an intermediate layer formed on said magnetic flux confinement layer; and a recording layer of a vertical magnetization film formed on said intermediate layer, wherein said magnetic flux confinement part comprises a plurality of soft magnetic parts each formed along a track region of said plural track regions and a non-magnetic part formed between said track region and an adjacent track region, said intermediate layer comprises a non-magnetic material and is formed so as to cover a surface of said soft magnetic parts and said non-magnetic parts.

According to the present invention, the magnetic flux from the magnetic pole of the recording head is confined, at the time of recording, by said soft magnetic part and the spreading of the magnetic flux in the recording layer is suppressed. Thus, the magnetic flux is concentrated and the recording magnetic field can be increased, and the problem of side erasing or side writing is effectively suppressed.

Further, as a result of formation of the intermediate layer covering the magnetic confinement layer, the recording layer is grown uniformly on the uniform surface of the intermediate layer, and the crystal orientation and quality of the crystal grains forming the recording layer are improved. Thereby, the recording layer thus formed provides excellent magnetic characteristics free from the fine structure of the magnetic confinement layer formed of the soft magnetic part and the non-magnetic part, and the medium noise at the time of playback of the information is suppressed. As a result, the problem of the side erasing is successfully suppressed and the S/N ratio is improved. Thereby, a vertical magnetic recording medium enabling high density recording is provided.

In the magnetic confinement layer, it should be noted that the non-magnetic part may be formed by a resin material. With this, the pattern of the non-magnetic part can be formed easily with high precision.

Further, the soft magnetic part may be formed such that the length thereof in the lateral direction is smaller at the surface part than at the bottom part. Thereby, the magnetic flux in the recording layer is further confined, and the suppressing effect of the side erasing is further increased.

In another aspect of the present invention, there is provided a magnetic storage apparatus, comprising:

a recording playback part having a magnetic head; and a vertical magnetic recording medium of any of those mentioned above.

According to the present invention, it becomes possible to realize a high performance magnetic storage apparatus capable of suppressing the problems of side erasing and side writing and simultaneously improving the S/N ratio by reducing the medium noise.

In another aspect of the present invention, there is provided a manufacturing method of a vertical magnetic recording medium having a magnetic layer including a track region recorded with information by a magnetic head and an inter-track region separating said track region from another track region offset from said track region in a width direction thereof, said track region and said inter-track region being formed magnetically in said recording layer, said method comprising the steps of:

forming a soft magnetic backing layer on a substrate;

forming a magnetic confinement layer on said soft magnetic layer;

forming an intermediate layer so as to cover said magnetic confinement layer; and forming a recording layer on said intermediate layer, said step of forming said magnetic flux confinement layer comprising;

a first processing step of forming a non-magnetic layer such that said non-magnetic layer covers said soft magnetic layer;

a second processing step of forming an opening in said non-magnetic layer; and a third processing step of filling said opening with a soft magnetic material to form said soft magnetic material.

According to the present invention, the non-magnetic part of the magnetic flux confinement layer is formed first and the soft magnetic part is then deposited on the soft magnetic backing layer. Thus, the soft magnetic material experiences little damages as compared with the case of forming the soft magnetic part by applying an etching process to a continuous film of a soft magnetic material, and thus, it becomes possible to form the soft magnetic part to have a low coercive force, high magnetic permeability and high saturation magnetic flux density. Thereby, the magnetic saturation in the soft magnetic part is suppressed and the problem or side erasing or side writing is suppressed effectively.

According to the present invention, a vertical magnetic recording medium is provided in which the problem of side erasing is suppressed and the S/N ratio is improved, by suppressing the spreading of the magnetic flux exiting from the magnetic head. Further, according to the present invention a magnetic storage apparatus using such a vertical magnetic recording medium and the manufacturing method of the vertical magnetic recording medium are obtained.

Other objects and further features of the present invention will become apparent from the following detailed description when read in conjunction with the attached drawings.

DETAILED DESCRIPTION OF THE INVENTION

Hereinafter, the present invention will be described for an embodiment with reference to the drawings.

FIRST EMBODIMENT

Figure 1:
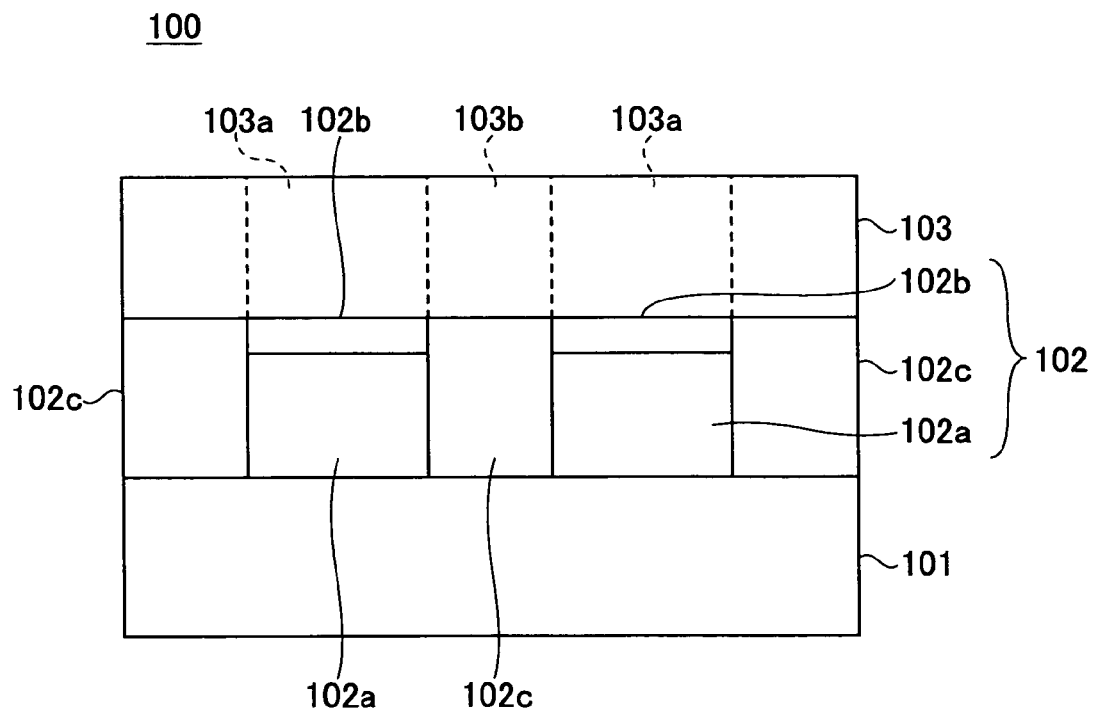
FIG. 1 is a cross-sectional diagram showing the construction of a conventional vertical magnetic recording medium.
Figure 2:
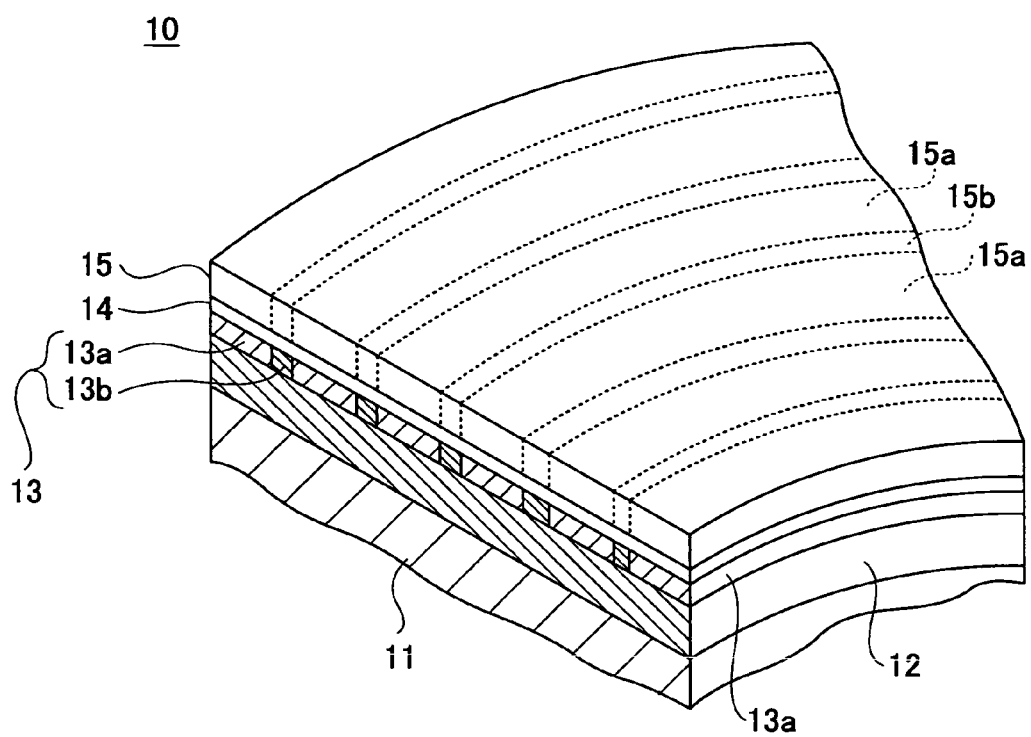
FIG. 2 is a diagram showing a part of the vertical magnetic recording medium according to a first embodiment of the present invention.
Figure 3:
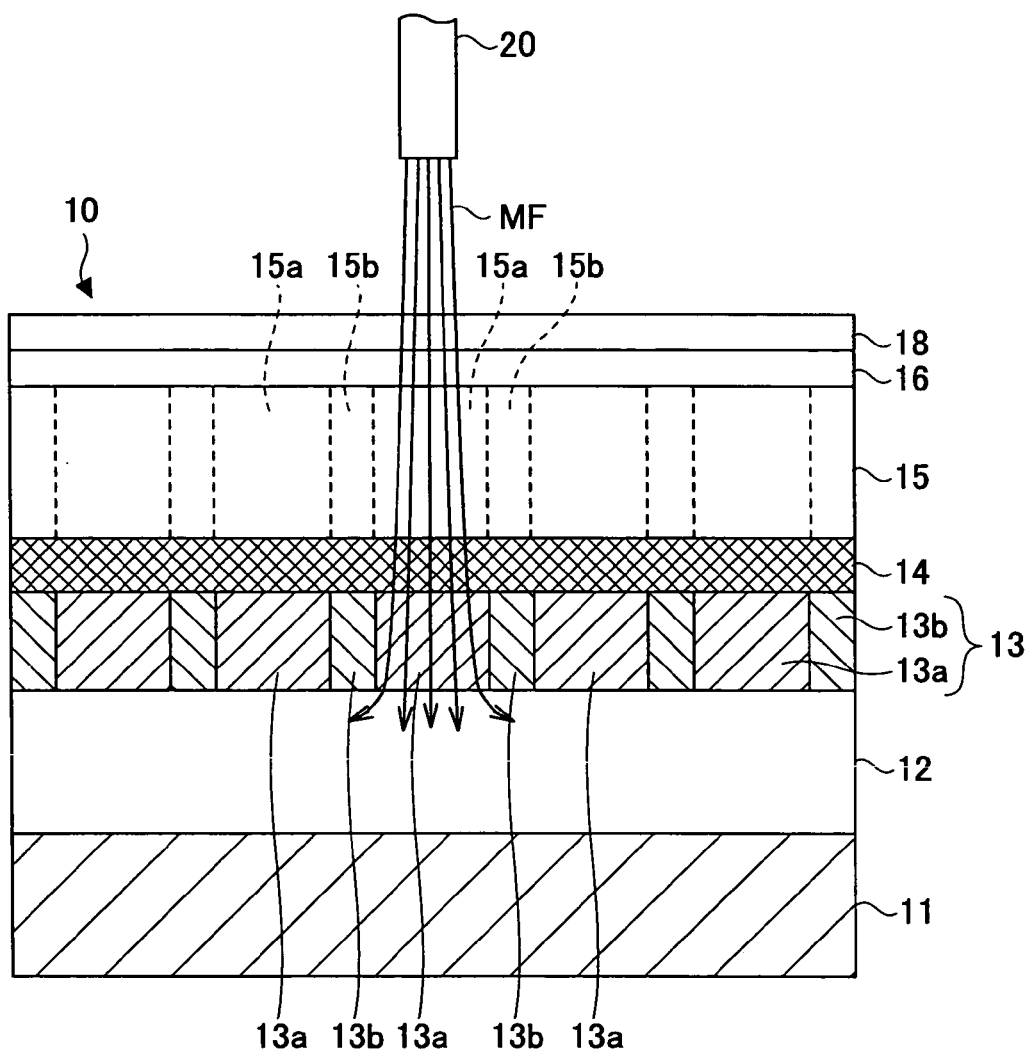
FIG. 3 is a cross-sectional diagram showing the construction of the vertical magnetic recording medium of the first embodiment.

FIG. 2 is a diagram showing a part of the vertical magnetic recording medium according to a first embodiment of the present invention. Further, FIG. 3 is a cross-sectional diagram of the vertical magnetic recording medium shown in FIG. 2. In FIG. 2, it should be noted that a protective film and a lubricating film 18 are omitted for the sake of convenience of the explanation. FIG. 3 shows the cross-section taken along the direction of the track.

Referring to FIGS. 2 and 3, the vertical magnetic recording medium 10 of the present embodiment is constructed on a substrate 11, wherein the substrate 11 carries thereon a layered structure including a soft magnetic backing layer 12, a magnetic confinement layer 13, an intermediate layer 14 and a recording layer 15 with this order, and the protective layer 16 and the lubricating layer 18 are formed further thereon consecutively. Further, the magnetic flux confinement layer 13 is formed of a soft magnetic part 13a and a non-magnetic part 13b.

In the vertical magnetic recording layer 10, it should be noted that the magnetic flux confinement layer 13 is provided between the soft magnetic backing layer 12 and the recording layer 15 and that the track region 15a is formed in the magnetic layer 15 for recording information magnetically. Thereby, the soft magnetic part 13a is formed in the magnetic flux confinement layer 13 underneath the recording layer 15 so as to extend along the track 15a. Further, a pair of adjacent soft magnetic parts 13a are separated from each other by the intervening non-magnetic part 13b.

Thus, the magnetic flux MF is confined at the time of recording by the magnetic pole 20 of the recording head and the soft magnetic part 13a as shown in FIG. 3 and the lateral spreading of the magnetic flux MF in the recording layer 15 is suppressed. Thereby, the recording magnetic field is increased as a result of the concentration of the magnetic flux in such a track.

Further, it should be noted in FIG. 3 that, because of the formation of the intermediate layer 14 between the magnetic confinement layer 13 and the recording layer 15, there occurs a uniform growth of the recording layer 15 on the uniform surface of the intermediate layer 14, and the alignment of crystal orientation or crystal quality of the crystal grains in the recording layer 15 are improved. Thereby, it becomes possible to form the recording layer 15 having excellent magnetic characteristics while eliminating the influence of the fine structure of the magnetic flux confinement layer 13 formed of the soft magnetic part 13a and the non-magnetic part 13b.

Hereinafter, the vertical magnetic recording medium 10 will be explained more specifically.

The substrate 11 is formed of any of a glass ceramic substrate, a tempered glass substrate, a Si substrate, an Al alloy substrate, and the like, while it is also possible to use a film such as polyester (PET), polyethylenenaphthalate (PEN), a heat resistant polyimide (PI), and the like, in the case the vertical magnetic recording medium 10 has a tape form.

For example, the soft magnetic backing layer 12 has a thickness of 50 nm-2 µm and may be formed of an amorphous or microcrystalline alloy containing at least one element selected from the group of Fe, Co, Ni, Al, Si, Ta, Ti, Zr, Hf, V, Nb, C, B, or a laminated film of these alloys. From the view point of focusing of the magnetic flux MF from the magnetic pole 20, it is preferable to use a soft magnetic material having a saturation magnetic flux density Bs of 1.0 T or less for the soft magnetic backing layer 12. Further, it is preferable that the soft magnetic backing layer 12 has a coercive force of 790 kA/m or less.

Further, it is possible to use FeSi, FeAlSi, FeTaC, CoNbZr, CoCrNb, NiFeNb, NiP, and the like, for the soft magnetic backing layer 12. This soft magnetic backing layer 12 may be formed by a plating process, sputtering process, evaporation deposition process, CVD process, and the like, wherein it is preferable to use the plating process for the formation of the soft magnetic backing layer 12 in view of its excellent efficiency of mass production and the possibility of using the current plating facility used for production of the current substrates of in-plane magnetic recording medium.

It should be noted that the soft magnetic backing layer 12 is the one used for absorbing almost all the magnetic fluxes MF from the magnetic head 20, and thus, it is preferable that the soft magnetic backing layer 12 has a large product value of the saturation magnetic flux density and the film thickness for carrying out saturation recording into the recording layer 15. Further, in view of writing made at high transfer rate, it is preferable that the soft magnetic backing layer 12 has a large high frequency magnetic permeability.

The soft magnetic confinement layer 13 is formed of the soft magnetic part 13a of a soft magnetic material and the non-magnetic part 13b of a non-magnetic material. Thereby, the soft magnetic part 13a is formed underneath the track region 15a formed magnetically in the recording layer 15 in the form of a concentric pattern, wherein each soft magnetic part 13a forms a generally concentric circle pattern with respect to the concentric track region 15a.

It should be noted that the non-magnetic region 13b separates the soft magnetic part 13a adjacent thereto from another adjacent soft magnetic part 13a adjacent to the first mentioned soft magnetic part 13a across the non-magnetic part 13b, wherein the non-magnetic part 13b is formed along the inter-track region 15b of the recording layer 15. The soft magnetic part 13a may be formed continuously for one full circle, while this is not a mandatory requirement.

Further, it should be noted that, while explanation has been made about the location where the soft magnetic part 13a and the non-magnetic part 13b are formed in relation to the track region 15a formed magnetically in the recording layer 15, it is needless to mention that the soft magnetic part 13a and the non-magnetic part 13b are formed on a circle having a center coincident to the center of the magnetic disk, provided that the substrate 11 forms a magnetic disk.

The thickness of the magnetic flux confinement layer 13, and hence the thickness of the soft magnetic part 13a, is chosen appropriately depending on the magnetic permeability of the soft magnetic part 13a, for example to the thickness of 20 nm-200 nm.

The width of the soft magnetic part 13a and the non-magnetic part 13b (the length in the radial direction), is chosen appropriately depending on the width of the track region 15a and the track density. For example, the soft magnetic part 13a may have the width of 130 nm, while the non-magnetic part 13b has the width of 90 nm.

For the soft magnetic material for the soft magnetic part 13a, it is possible to use a material containing one or more of Co, Fe and Ni as a major component, such as a Co alloy, a Fe alloy, a Ni alloy, and the like. Further, the soft magnetic part 13a may contain one of Al, Ta, Ag, Cu, Pb, Si, B, Zr, Cr, Ru, Re, Nb and C as an additional component. For example, CoNbZr, CoZrTa, FeC, FeC, NiFe, FeTaC, FeCoAl, CoFeNiB, and the like, can be used advantageously for the soft magnetic material, wherein it is particularly preferable that the soft magnetic material has the coercive force Hc of 790 A/m or less.

The soft magnetic material constituting the soft magnetic part 13a may be the identical material forming the soft magnetic backing layer 12. It is preferable, however, that the soft magnetic material forming the soft magnetic part 13a has a saturation magnetic flux density Bs2 larger than the saturation magnetic flux density Bs1 of the soft magnetic material forming the soft magnetic backing layer 12. Thereby, magnetic saturation is not likely caused in the soft magnetic part 13a at the time of the recording, and improvement is achieved in the overwrite characteristics or NLTS (Non Linear Transition Shift) characteristics.

Designating the thickness of the soft magnetic backing layer 12 as t1 and the thickness of the soft magnetic part 13a as t2, it is preferable that there holds the relationship of $Bs1 \times t1 > Bs2 \times t2$, or $Bs1 \times t1 \approx Bs2 \times t2$, provided that there holds the relationship Bs1<Bs2.

Further, from the easiness of collecting magnetic flux, it is preferable that the soft magnetic part 13a has a magnetic permeability μ2 larger than a magnetic permeability μ1 of the soft magnetic backing layer 12.

With regard to the resistivity of the soft magnetic material constituting the soft magnetic part 13b, it should be noted that a value of about 20 μΩ/cm² is usually obtained in the case of using NiFe. However, in the case of performing a high-frequency recording, there is a possibility that the magnetic permeability decreases as a result of generation of eddy current. Thus, with regard to the resistivity of the soft magnetic material constituting the soft magnetic part 13a, it is preferable to use a soft magnetic material of 20 μΩ or more, more preferably 40 μΩ or more in view of suppressing of the eddy current.

With regard to the resistivity of the soft magnetic material, the higher the more it is preferable. On the other hand, from the view point of electric charging in the case the non-magnetic part is formed of an insulating material, it is preferable that the resistivity does not exceed 10 mΩ·cm. For such a soft magnetic material, it is possible to use any of CoNbZr, CoZrTa, FeC, FeC, NiFe, FeTaC, FeCoAl, CoFeNiB and FeCoMO (at least the one in which M is chosen from the group consisting of Al, B, Ga, Si, Ge, Y, Ti, Zr, Hf, V, Nb, Ta, Cr, Mo, W, Rh, Ru, Ni, Pd and also Pt).

The non-magnetic part 13b is formed of a non-magnetic material. While the non-magnetic material is not particularly specified, it is possible to use an inorganic material such as $SiO_2$, $Al_2O_3$, $TiO_2$, TiC, C, hydrogenated carbon, and the like. Further, a non-magnetic material such as Co, Cr, Ru, Re, Hf and an alloy of these, may be used also for the non-magnetic material.

Further, it is possible to use a resin material such as a thermoplastic resin or a photosensitive resin material for the material of the non-magnetic part 13b. More specifically, the resin such as Polyethylene, polyurethane, polyamide, polyvinyl chloride, metacrylpolycarbonate, epoxy, polyolefin, and the like, can be used for the thermoplastic resin. Thereby, it becomes possible to form the pattern of the non-magnetic part 13b easily by pressing and heating the stamper formed with the pattern as will be explained later. Further, it is possible to use acrylates such as epoxy acrylate, urethane acrylate, polyester acrylate, polyether acrylate or a UV-cure or X-ray-cure or electron-beam-cure resin such as a cycloaliphatic epoxy resin or a glycidylether for the photosensitive resin material. By using the photosensitive resin material, it is possible to form the pattern of the non-magnetic part 13b with high precision by using a photolithographic process.

In the case where the vertical magnetic recording medium is a tape such as a serpentine type tape (illustration omitted), it should be noted that the track is formed so as to extend in the elongating direction of the tape, and the track regions and the inter-track regions are disposed parallel with each other in the tape width direction. In such a case, the soft magnetic part and the non-magnetic part are formed with the same form and arrangement as those of the track regions.

The intermediate layer 14 is formed with the thickness of 1-40nm so as to cover the magnetic flux confinement layer 13 and may be formed of a non-magnetic material such as $SiO_2$, $Al_2O_3$, $TiO_2$, TiC, C, hydrogenated carbon, and the like. It is preferable that the non-magnetic material is an amorphous material or a microcrystalline material. With this, the influence of existence of different regions in the surface of the magnetic flux confinement layer 13 caused by the existence of the soft magnetic part 13a and the non-magnetic part 13b, is prevented from reaching the intermediate layer 14, and a uniform surface is obtained for the intermediate layer 14. As a result, the influence of the surface structure of the magnetic flux confinement layer 13 does not reach the recording layer 15, and the crystal grains constituting the recording layer are formed to have the grain size and crystal orientation free from the influence of the surface of the magnetic flux confinement layer 13.

It should be noted that the intermediate layer 14 is not limited to a single layer of such a non-magnetic material but may be formed to have a laminated structure of plural layers (illustration omitted). For example, it is possible to laminate non-magnetic metal intermediate layers each having a thickness of 2-30 nm and formed of any of Co, Cr, Ru, Re, Ri and Hf or an alloy thereof. Preferably, the non-magnetic metal intermediate layer may be formed of a Ru film, a RuCo film, a CoCr film, and the like and may have the hcp structure. In the case the recording layer 15 has such an hcp structure, it is possible to form the crystal layer 15 by an epitaxial growth process. Thereby, the quality of crystal of the recording layer 15 is improved.

Further, it should be noted that the intermediate layer 14 may have a laminated structure (illustration omitted) including a seed layer and an ground layer, such that the non-magnetic metal intermediate layer of the foregoing is formed on the ground layer. Thereby, the seed layer is formed of an amorphous material having a thickness of 1.0-10 nm and may be selected from any of Ta, C, Mo, Ti, W, Re, Os, Hf and Mg, or an alloy of these. Because the seed layer is thus formed of an amorphous material, it is possible to increase the degree of crystallization of the ground layer formed thereon and interrupt the relationship of crystal orientation or crystal growth between the magnetic flux confinement layer 13 and the recording layer 15.

With regard to the ground layer, it is possible to use a soft magnetic material having a thickness of 0.5-20 nm and formed primarily of any of Co, Fe, Ni, a Co alloy, a Fe alloy and a Ni alloy, an example of which is a NiFe alloy (Permalloy). In addition, the ground layer may contain one of the elements selected from the group of Mo, Cr, Cu, V, Nb, Al, Si, B, C and Zr as an added component. The ground layer thus formed facilities the initial crystal growth of the non-magnetic metal intermediate layer formed thereon, and thus, the crystal quality of the intermediate layer 14 is improved. By constituting the intermediate layer 14 as noted above, the quality of crystal of the recording layer 15 is improved.

The recording layer 15 is a so-called vertical magnetization film having an easy axis of magnetization in the thickness direction of the film. Typically, the recoding layer 15 is formed to have a thickness of 3-30 nm and is formed of a material selected from any of Ni, Ge, Co, a Ni alloy, a Fe alloy, and a Co alloy including CoCrTa, CoCrPt, CoCrPt-M, wherein M is selected from any of B, Mo, Nb, Ta, W, Cu and an alloy of these.

It should be noted that such ferromagnetic alloy forming the recording layer 15 has a columnar microstructure. In the case the ferromagnetic alloy has the hcp structure, the growth direction or thickness direction of the recording layer 15 agrees with the (001) surface, and the easy axis of magnetization is aligned in the thickness direction of the magnetic film. For example any of the materials such as CoCrPtB, CoCrPtTa, CoCrPtTaNb can be used for the recording layer 15.

Further, the recording layer 15 may include a non-magnetic phase of a non-magnetic material such as a compound of an element selected from any of Si, Al, Ta, Zr, Y and Mg and an element selected from any of O, C and N, such that the non-magnetic phase separates the columnar crystal grains of the ferromagnetic alloy from each other. For such a recording layer, it is possible to use the system of $(CoPt)-(SiO_2)$, $(CoCrPt)-(SiO_2)$, $(CoCrPtB)-(MgO)$, and the like. Because the magnetic particles form a columnar structure in such a construction an the non-magnetic phase is formed so as to surround the magnetic particles, the magnetic particles are separated from each other and the interaction between the magnetic particles is effectively suppressed. Thereby, the medium noise can be reduced.

Further, it should be noted that the recording layer 15 may be formed of an artificial superlattice of any of Co/Pd, CoB/Pd, Co/Pt and CoB/Pt. The artificial superlattice can be formed by laminating CoB (thickness 0.3 nm) and Pd (thickness 0.8 nm) alternately, with 5 to 30 layers for each. Such an artificial superlattice film has an advantageous feature of large vertical magnetic anisotropy and excellent thermal stability.

The protective film is formed by sputtering process, CVD process, FCA (Filtered Cathodic Arc) process, and the like, and may be provided in the form of a hydrogenated carbon, carbon nitride, aluminum oxide, zirconium oxide, and the like.

The lubrication layer 18 is applied by a dipping process, spin coating process, and the like, and may be formed with a thickness of 0.5-5 nm by using a lubricating material such as the one having a principal chain of perfluoropolyether. This lubrication layer 18 may be omitted depending on the combination with the protective film or combination with the magnetic head.

In the vertical magnetic recording medium 10 of the present embodiment, the magnetic flux confinement layer 13 is provided on the soft magnetic backing layer 12 such that the magnetic flux confinement layer 13 includes the soft magnetic part 13a and the non-magnetic part 13b separating the soft magnetic part 13a from an adjacent soft magnetic part 13a, in such a manner that the soft magnetic part 13a extends along the track formed magnetically in the recording layer 15. Further, because the intermediate layer 14 covering the magnetic flux confinement layer 13 is formed as the ground layer of the recording layer 15, the crystal grains of the ferromagnetic material constituting the recording layer 15 are formed uniformly, and it becomes possible to suppress the problem of side erasing or side writing by focusing the magnetic flux MF from the magnetic head to the recording layer 15. Thus, the medium noise is suppressed successfully at the time of playback, and a vertical magnetic recording medium capable of maintaining high S/N ratio at the time of high density recording is obtained.

Because the soft magnetic part 13a is formed on the soft magnetic backing layer 12, the magnetic flux from the recording head is guided to the soft magnetic backing layer 12 by the soft magnetic part 13a, while suppressing the magnetic saturation of the soft magnetic part 13a.

Next, the manufacturing process of the vertical magnetic recording medium according to the present invention will be explained with reference to FIGS. 4A-4D and FIGS. 5A and 5B.

Figure 4A:
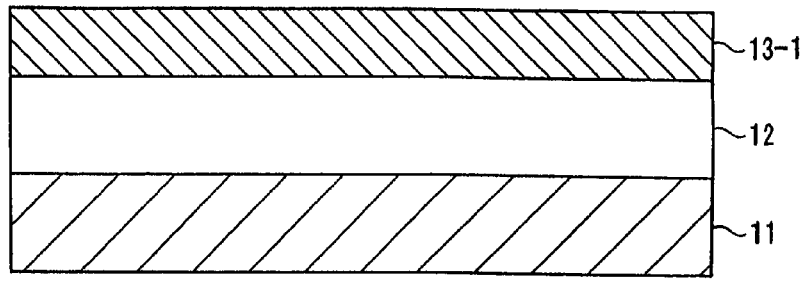
FIGS. 4A-4D are diagrams showing the fabrication process of the vertical magnetic recording medium of the first embodiment.

Referring to FIG. 4A, the soft magnetic backing layer 12 is formed on the substrate 11, which may be a glass substrate, by any of sputtering process, electroplating process, non-electrolytic plating process, and the like. In the case of using a non-electrolytic plating process, it is necessary to carry out an activation processing of the surface of the substrate 11.

In the step of FIG. 4A, a non-magnetic layer 13-1 used for the non-magnetic part 13b of the magnetic flux confinement layer 13 is further formed on the soft magnetic backing layer 12. Here, the non-magnetic layer is formed by applying a solution, in which a thermoplastic resin, such as polyurethane or polyvinyl chloride into an organic solvent, upon the soft magnetic backing layer 12 by a spin coating process of dipping process, followed by an evaporation process of the organic solvent by heating, such that the non-magnetic layer 13-1 has a thickness of 20-200 nm after drying.

Figure 4B:
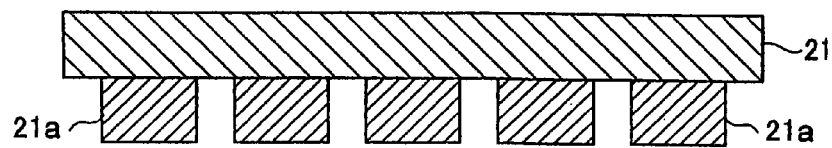

Next, in the step of FIG. 4B, a molding die 21 having a projection pattern corresponding to the soft magnetic part 13a of FIG. 3 is urged upon the non-magnetic layer 13-1 by using a press (not shown) with the pressure of about 7.84×10$^6$ Pa (80 kgf/cm$^2$) while heating the substrate 11 of FIG. 4. Thereby, it should be noted that the mold 21 includes projections 21a in the concentric form similarly to the pattern of the track regions of the recording layer shown in FIG. 2.

Figure 4C:
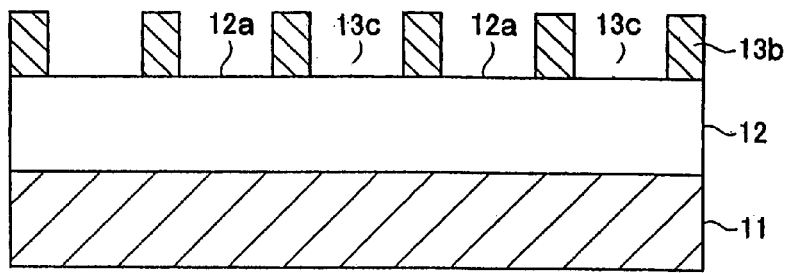

As a result, as shown in FIG. 4C, the non-magnetic part 13b and an opening 13c are formed on the soft magnetic backing layer 12. Thereby, it should be noted that the temperature of heating of the substrate 11 in the step of FIG. 4B is chosen appropriately based on the change of the elastic constant such as softening point of the thermoplastic resin. In the case the soft magnetic backing layer 12 is an amorphous layer, it is preferable to use the heating temperature of 280° C. or less for avoiding crystallization. In the case the soft-magnetic layer 12 is a microcrystalline material, it is preferable to use the temperature of 450° C. or less for facilitating growth of the microcrystals. With regard to the lower limit of the foregoing heating temperature, the material of the foregoing thermoplastic resin is chosen appropriately in view of the retention characteristics of the vertical magnetic recording medium 10. Generally, it is preferable that the heating temperature is 80° C. or higher.

In the case there remains a part of the non-magnetic layer 13-1 in the opening 13c and the surface of the soft magnetic backing layer 12a is not exposed completely at the opening 13c, the processing for exposing the surface 12a of the soft magnetic backing layer 12 completely at the opening 13c may be conducted, by applying a dry etching process such as an ion milling process or a wet etching process to the surface of the structure of FIG. 4C.

In the case the vertical magnetic recording medium 10 is a magnetic disk, it is preferable to form the opening at the both surfaces (front surface and rear surface) of the magnetic disk at the same time in this step. With this, it becomes possible to form the soft magnetic part 13b on the front surface and rear surface of the magnetic disk simultaneously by aligning the respective centers of the molding die for the front surface and the molding die for the rear surface. Thereby, it becomes possible to achieve simultaneous accessing to both disk surfaces for the magnetic heads.

Further, it is possible to form the foregoing non-magnetic part 13b and the opening 13c by a photolithographic process by using a photoresist material for the foregoing non-magnetic layer 13-1 in place of the thermoplastic resin.

More specifically, the foregoing non-magnetic layer 13-1 is formed by a positive photoresist material such as an acrylate or an epoxy rein, and the pattern of the opening 13c is formed by exposing with ultraviolet radiation, electron beam or X-ray, followed by developing. Further, it is possible to use a negative photoresist material. In this case, the opening 13c is formed by exposing the pattern of the non-magnetic part 13b and by removing the unexposed part by carrying out developing.

Figure 4D:
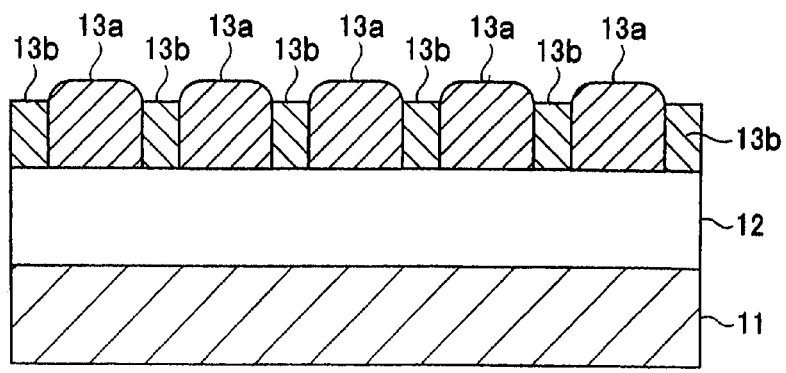

Next, in the step of FIG. 4D, the opening 13c of FIG. 4C is filled with a non-magnetic material by a non-electrolytic plating process, and with this, the soft magnetic part 13a is formed.

In more detail, a plating bath (pH 2-10) containing Co ions, Fe ions, Ni ions, complexes and a reducing agent containing boron is prepared to have the temperature of 40-95° C., and the non-electrolytic plating is conducted by dipping the structure of FIG. 4C into such a plating bath thus prepared under agitation. Thereby, the duration of the plating process is chosen appropriately depending on the plating rate and the thickness of the plating film. The thickness of the plating film, in other words the thickness of the soft magnetic part 13a thus formed, is set such that the soft-magnetic part 13a projects beyond the non-magnetic part 13b.

It should be noted that the non-electrolytic plating process is preferable in view of the point that a soft magnetic material of high saturation flux density and high magnetic permeability is obtained.

For example, a magnetic property such as saturation magnetic flux density Bs of 1.7-1.9 T, the coercive force Hc of about 200 A/m and the magnetic permeability of about 500 can be obtained, by forming the soft magnetic part 13a of $Co_{1-x-y-z}Fe_xNi_yB_z$ (x=15-23 atomic %, y=13-15 atomic %, z=0.5-5 atomic %) by way of non-electrolytic plating process.

In the case of forming the soft magnetic part 13a of the composition $CO_{65}Fe_{19}Ni_{15}B_1$ (suffixes represent the atomic concentration of the respective elements), a plating bath containing $CoSO_4.7H_2O$: 0.07 mol/L; $FeSO_4.7H_2O$: 0.03 mol/L; $NiSO_4.6H_2O$: 0.004 mol/L, ammonium sulfate: 0.2 mol/L; sodium citrate acid: 0.02 mol/L; sodium tartrate: 0.35 mol/L; phosphoric acid: 0.06 mol/L, dimethylamineborane: 0.1 mol/L, pH: 9, bath temperature: 70° C., may be used.

Further, the use of a non-electrolytic plating process is preferable in view of the low production cost and low facility cost as compared with the case of using a vacuum process such as sputtering process or vacuum evaporation deposition process. Further, in the case of using the non-electrolytic plating process, formation of the plating film is suppressed on the surface of the non-magnetic part 13b, when the non-magnetic part 13b is formed of a thermoplastic resin or a photoresist material, due to the difference of catalytic activity between the surface of the soft magnetic backing layer 12a and the non-magnetic layer 13b, and it becomes possible to form the plating film selectively in the opening 13c by using the non-electrolytic plating process. As a result, the planarization step following the plating process is facilitated.

Further, it is also possible to use an electrolytic plating process or sputtering process in place of the non-electrolytic plating process. In the case of using the electrolytic plating process, the soft magnetic backing layer 12 is used for the cathode and the soft magnetic material is filled in to the opening 13c. In this case, the soft magnetic material does not deposit on the surface of the non-magnetic part 13b, and the planarization process in the following step is facilitated.

Figure 5A:
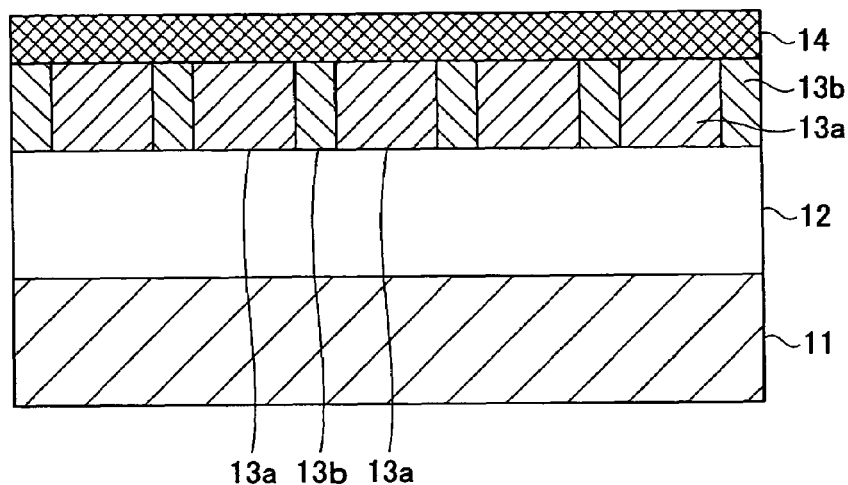
FIGS. 5A and 5B are diagrams showing the further fabrication process of the vertical magnetic recording medium of the first embodiment.

Next, in the step of FIG. 5A, the surface of the structural body of FIG. 4D is planarized by a CMP process or an ion milling process. After the planarization process, it is preferable that the average surface roughness Ra of the magnetic confinement layer 13 is 1 nm or less, in view of the planarization of the surface of the intermediate layer 14 formed thereon. More specifically, it is preferable that the magnetic confinement layer 13 has an average surface roughness of 0.2-0.4 nm.

Further, with the use of a CMP process, which is a wet process, it is possible to carry out the planarization process directly after the plating process by omitting the cleaning process conducted after the plating process. Further, with the use of a CMP process, a large processing capability is achieved.

Next, in the step of FIG. 5A, the intermediate layer 14 of the material explained before is formed on the magnetic confinement layer 13 thus planarized, by using a sputtering process or a vacuum evaporation deposition process. The same process is used also in the case the intermediate layer 14 is formed of the lamination of a seed layer, the ground layer and the non-magnetic metal intermediate layer.

Figure 5B:
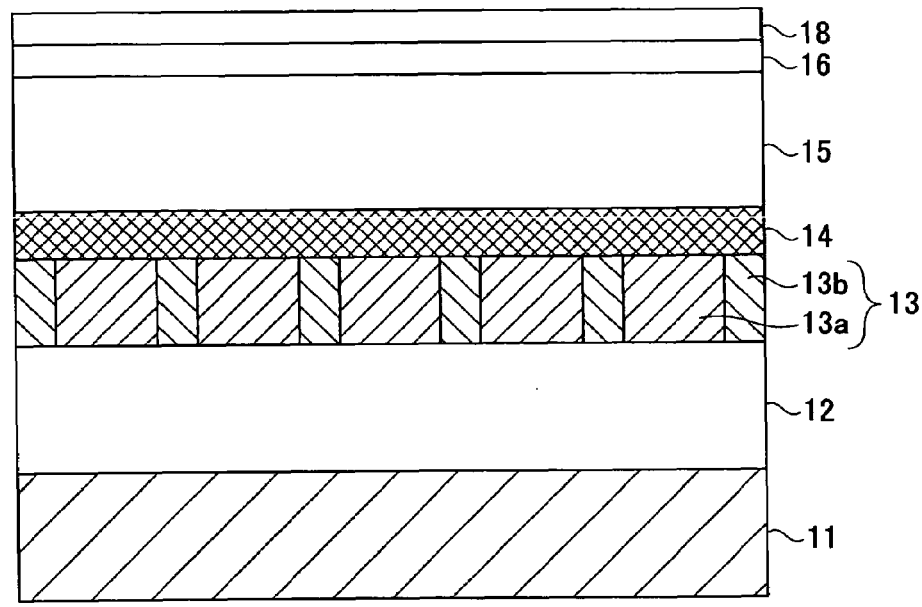

Next, in the step of FIG. 5B, the recording layer 15 is formed on the intermediate layer 14 by a sputtering process or vacuum evaporation deposition process by using the material explained before, and the protective layer 16 is formed on the recording layer 15 by using sputtering process, CVD process, or FCA process while using the material explained before.

Further, in the step of FIG. 5B, the lubrication layer 18 is formed by applying a lubricating agent on the surface of the protective film 16 by way of spin coating process, liquid surface lowering method, pulling up method, and the like. With this, the vertical magnetic recording medium shown in FIG. 5B is obtained.

According to the vertical magnetic recording method 10 of the present embodiment, the non-magnetic part 13b of the magnetic flux confinement layer 13 is formed at first and the soft magnetic part 13a is deposited thereafter on the soft magnetic backing layer 12, and thus, the damages caused in the soft magnetic material is reduced as compared with the case of patterning a continuous film of soft magnetic material by etching. As a result, it becomes possible to form the soft magnetic part 13a with high coercive force and high magnetic permeability, and with high saturation magnetic flux density.

Next, a first modification of the vertical magnetic recording medium of the present embodiment will be explained.

Figure 6:
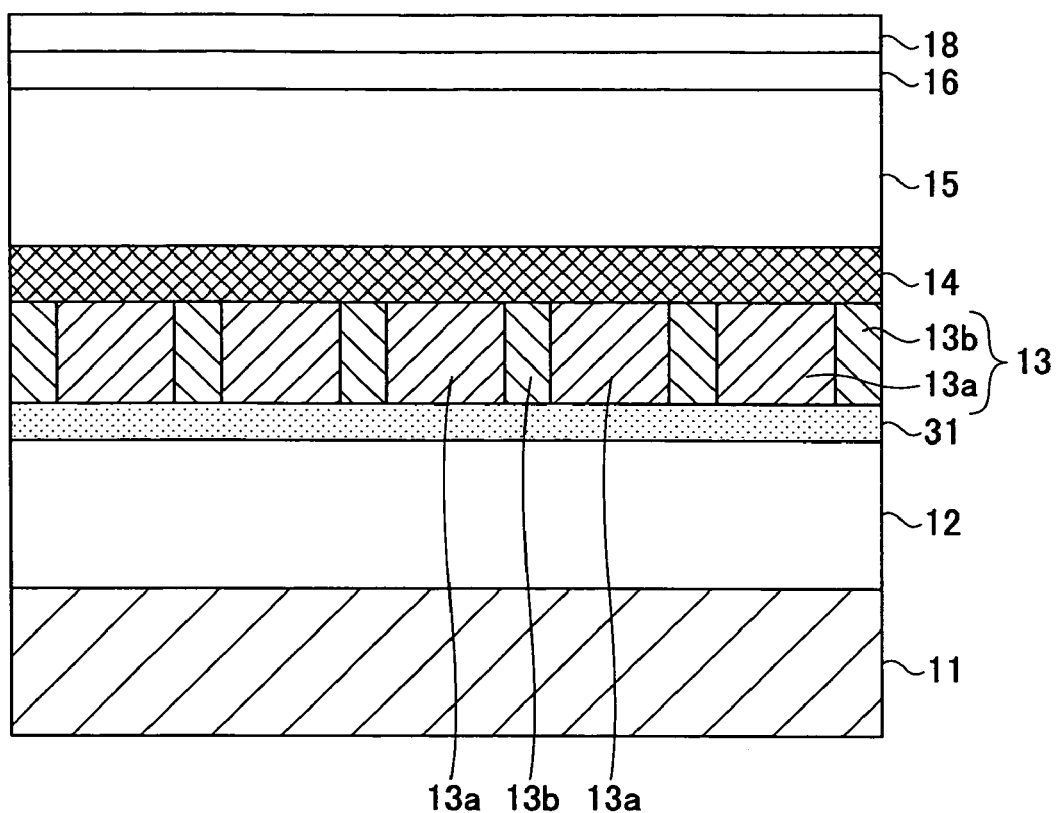
FIG. 6 is a cross-sectional diagram showing a vertical magnetic recording medium according to a first modification of the first embodiment.

FIG. 6 is a cross-sectional diagram of a vertical magnetic recording medium 30 according to the first modification of the present embodiment. Similarly to FIG. 3, FIG. 6 shows a cross-section of the vertical magnetic recording medium taken in the direction crossing the track regions. In the drawings, those parts corresponding to the parts explained before are designated by the same reference numerals and the description thereof will be omitted.

Referring to FIG. 6, the vertical magnetic recording medium 30 includes the substrate 11, and the soft magnetic backing layer 12, the magnetic flux confinement layer 13, the intermediate layer 14, the recording layer 15, the protective film 16 and the lubricating layer 18 are formed on the substrate 11 consecutively, wherein another intermediate layer 31 is interposed between the soft magnetic backing layer 12 and the magnetic flux confinement layer 13. Thus, the vertical magnetic recording medium 30 has a construction similar to that of the vertical magnetic recording medium of the first embodiment explained before, except that there is provided the first intermediate layer 31 between the soft magnetic backing layer 12 and the magnetic flux confinement layer 13. Further, the second intermediate layer 14 has a construction similar to the intermediate layer 14 of the first embodiment shown in FIG. 3 and thus represented by the same reference numeral.

The first intermediate layer 31 has a thickness of 1.0-10 nm and is formed of a non-magnetic amorphous material selected from $SiO_2$, $Al_2O_3$, $TiO_2$, TiC, C, hydrogenated carbon, Ta, C, Mo, Ti, W, Re, Os, Hf, Mg, and an alloy of these.

By providing the first intermediate layer, the relationship in the crystal orientation and size of the microcrystals between the soft magnetic backing layer 12 and the soft magnetic part 13a of the magnetic flux confinement layer 13 is disconnected, and the soft magnetic material constituting the soft magnetic part 13a can be formed in a self-organizing manner. Thereby, the soft magnetic part 13a is formed with excellent magnetic characteristics. Further, the first intermediate layer 31 disconnects the magnetic interaction between the soft magnetic backing layer 12 and the soft magnetic part 13a of the magnetic flux confinement layer 13.

By providing the first intermediate layer 31, the problem of damaging of the soft magnetic backing layer 12 at the time of removing the non-magnetic layer 13-1 such as the thermoplastic region remaining in the opening 13c by etching, is avoided, and formation of spike noise caused by such defects can by suppressed.

Thus, according to the present invention, it is possible to form the soft magnetic part 13a of the magnetic flux confinement layer 13 such that the soft magnetic part 13a has excellent magnetic characteristics, in addition to the effects achieved in the first embodiment, by providing the first intermediate layer 31 between the soft magnetic backing layer 12 and the magnetic flux confinement layer 13. Thereby, the magnetic interaction between the soft magnetic backing layer 12 and the soft magnetic part 13a of the magnetic flux confinement layer 13 is disconnected, and formation of spike noise, caused by the soft magnetic backing layer, is suppressed.

Next, the vertical magnetic recording medium having a second modification will be explained.

Figure 7:
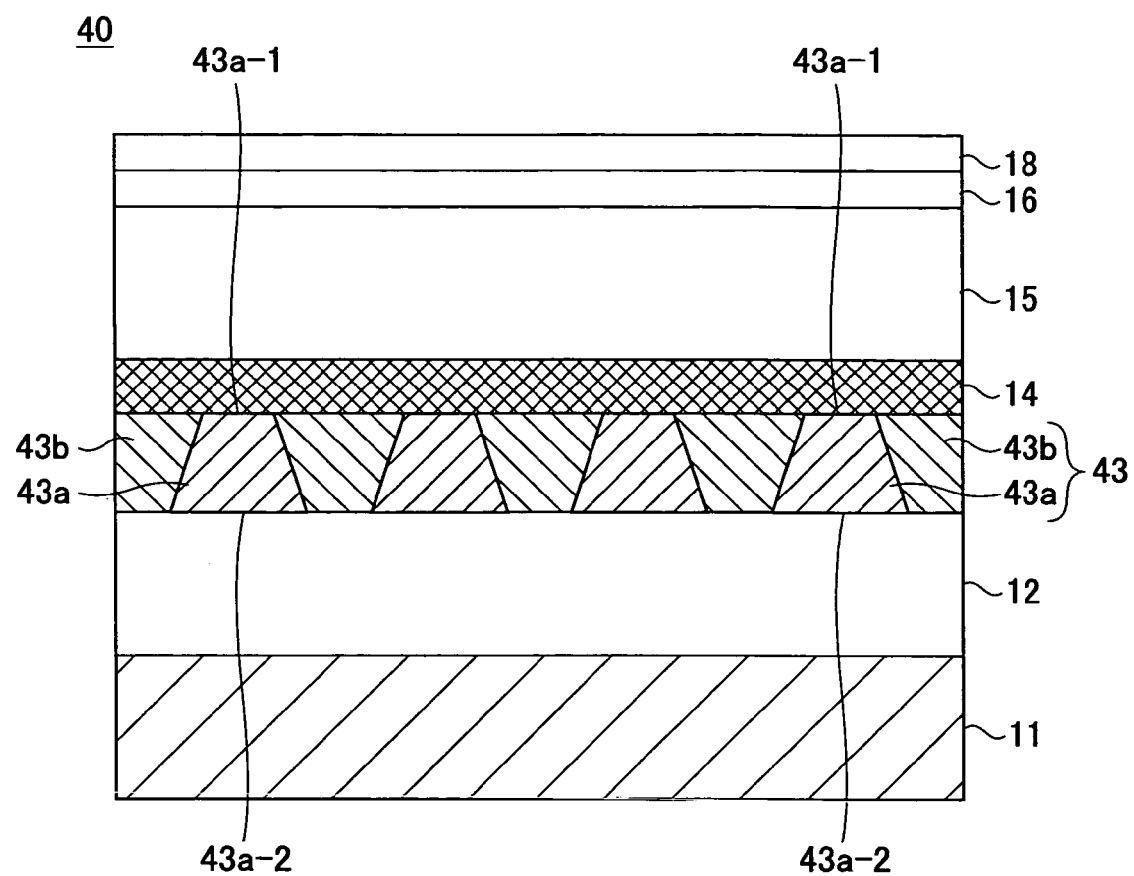
FIG. 7 is a cross-sectional diagram showing a vertical magnetic recording medium according to a second modification of the first embodiment.

FIG. 7 is a cross-sectional view showing the construction of a vertical magnetic recording medium 40 according to a second modification of the present embodiment, wherein it should be noted that FIG. 7 shows a cross-section taken so as to cross plural track regions similarly to the case of FIG. 3. In FIG. 7, those parts corresponding to the parts explained previously are designated by the same reference numerals.

Referring to FIG. 7, the vertical magnetic recording medium 40 is constructed on the substrate and has a layered structure similar to that of the vertical magnetic recording medium 10 of FIG. 3, except that a magnetic flux confinement layer 43 is used in place of the magnetic confinement layer 13. Thus, the layered structure includes the soft magnetic backing layer 12, the magnetic flux confinement layer 43, the intermediate layer 14, the recording layer 15, the protective layer 16 and the lubricating layer 18 formed consecutively on the substrate 11.

Referring to FIG. 7, it will be noted that the magnetic flux confinement layer 43 includes a soft magnetic part 43a of a trapezoidal form 43a and a non-magnetic part 43b of an inverted trapezoidal form. Otherwise, the magnetic flux confinement layer 43 has a construction similar to the one shown in the magnetic flux confinement layer 13 of FIG. 3.

More specifically, the magnetic flux confinement layer 43 is formed of a material similar to the magnetic flux confinement layer 13 of FIG. 3, except that the soft magnetic part 43a has a cross-sectional form changed from that of the soft magnetic part 13a such that a top edge 43a-1 thereof adjoining the intermediate layer 14 has a reduced length as compared with a bottom edge 43a-2 thereof adjoining the soft magnetic backing layer 12. Thereby, the soft magnetic part 43a has a surface area smaller in the top surface thereof as compared with the bottom surface thereof. As a result of such a construction of the soft magnetic part 43a, it becomes possible to confine the magnetic flux from the recording head further, and the problem of side erasing at the time of recording is eliminated further.

Further, it should be noted that the bottom surface of the soft magnetic part 43a contacting with the soft magnetic backing layer 12 is increased, the problem of magnetic saturation in such a soft magnetic part 43a is reduced further. For the purpose of effective suppressing of magnetic saturation in the soft magnetic part 43a, it is further preferable to use a material of high saturation flux density for the soft magnetic part 43a, and thus, it is preferable to use any of CoNiFeB, CoNiFeP, CoFeB, CoFeP, CoFe and FeCoC for the soft magnetic part 43a. In the construction of FIG. 7, it should be noted that the bottom surface 43a-2 of the soft magnetic part 43a may contact with the bottom surface 43a-2 of an adjacent soft magnetic part 43a.

FIGS. 8A-8D are diagrams showing the fabrication process of the vertical magnetic recording medium 40 of FIG. 7.

Referring to the drawings, the soft magnetic backing layer 12 and a non-magnetic layer 43-1 are formed on the substrate 11 similarly to the step of FIG. 4A explained before. The non-magnetic layer 43-1 may be formed of $SiO_2$, $Al_2O_3$, $TiO_2$, TiC, C, hydrogenated carbon, and the like deposited by a sputtering process or CVD process.

Figure 8A:
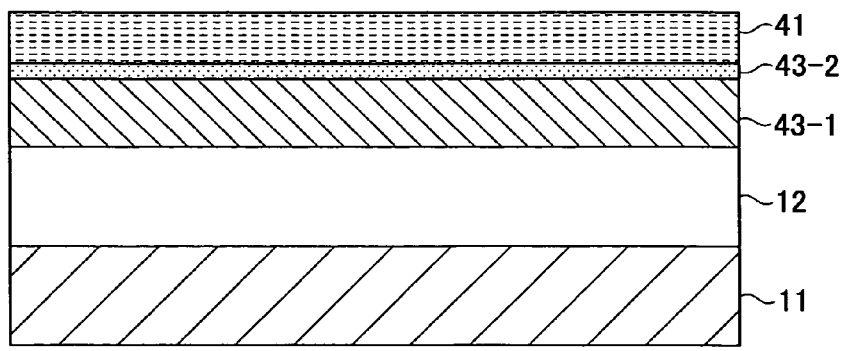
FIGS. 8A-8D are diagrams showing the manufacturing process of the vertical magnetic recording medium according to the second modification.

In the step of FIG. 8A, a silicon nitride film 43-2 is formed on the non-magnetic layer 43-1 with a thickness of 50 nm, for example, and a photoresist film 41 is formed on the silicon nitride film 43-2 with a thickness of 200 nm, for example.

Figure 8B:
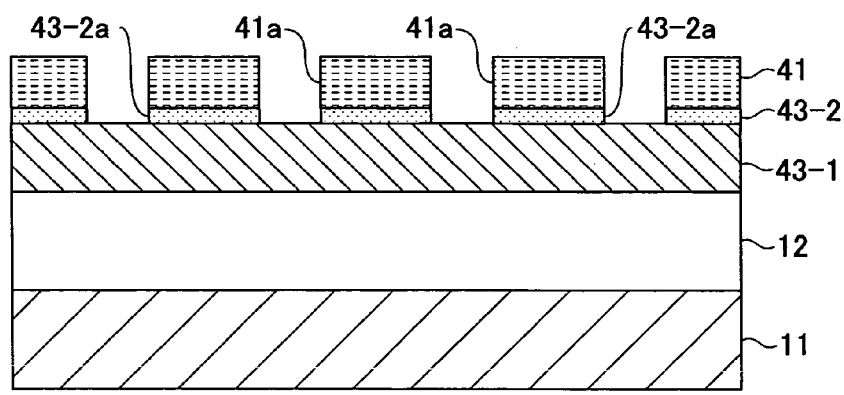

Next, in the step of FIG. 8B, the photoresist film 41 is patterned by a photolithographic process, and resist openings 41a are formed in correspondence to the soft magnetic part 43a to be formed. Further, by using such a patterned resist film 41, the silicon nitride film 43-2 is patterned by a dry etching process such as an ion milling process. Thereby, openings 43-2a are formed in the silicon nitride film 43-2.

Figure 8C:
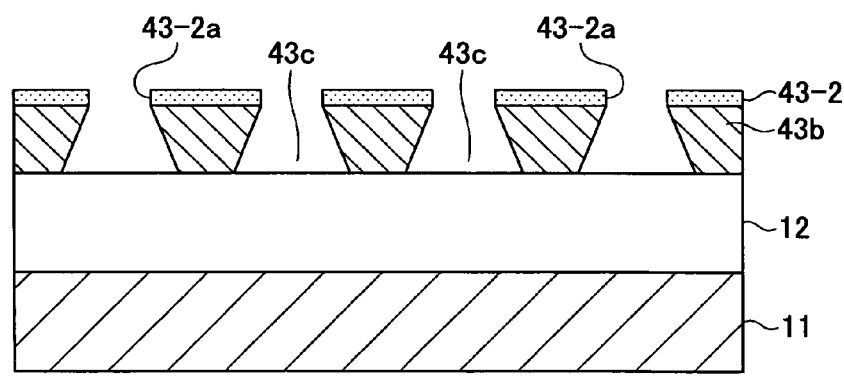

Next, in the step of FIG. 8C, the photoresist film 41 is removed and a selective etching process is applied selectively to the non-magnetic layer 43-1 with regard to the silicon nitride film 43-2 while using the silicon nitride film 43-2 as a mask, wherein the etching is conducted under an etching condition such that the isotropic etching prevails over the anisotropic etching acting in the depth direction. As a result, openings 43c are formed in the non-magnetic layer 43-1.

With regard to the etching process, it is possible to use an RIE (reactive ion etching) process that can be achieved according to a floating process in which the substrate 11 is disposed with a distance from the electrode or an anode coupling process in which the substrate 11 is disposed to the side of the anode.

In the case of using an $SiO_2$ film for the non-magnetic layer 43-1, a mixed gas of $CF_4$ and $H_2$ or a $C_3H_8$ gas is used in the RIE process. By using such an etching process, the opening 43c is formed to have a generally trapezoidal form as a result of increased lateral etching of the non-magnetic layer 43-1 with increasing distance (depth) from the silicon nitride film 43-2.

Figure 8D:
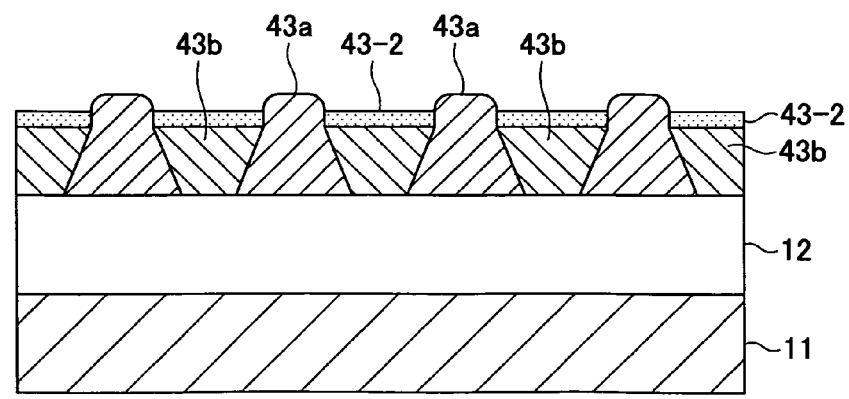

Next, in the step of FIG. 8D, the openings 43c of the structure of FIG. 8C are filled with the soft magnetic material by the non-electrolytic plating process similarly to the step of FIG. 4D, and the soft magnetic part 43a is formed as a result. The soft magnetic part 43a is formed to the level generally equal to or projecting slightly from the surface of the silicon nitride film 43-2.

Further, by conducting the process similar to those of FIGS. 5A and 5B explained before, the planarization process and the steps of forming the further layers including the intermediate layer 14 to the lubricating layer 18 (illustration omitted) are carried out, and the vertical magnetic recording medium 40 of the second modification is obtained.

In this planarization processing, the surface of the soft magnetic part 43a and the surface of the silicon nitride film 43-2 are planarized by using slurry that provides a higher polishing rate for the soft magnetic part 43a as compared with the silicon nitride film 43-2. As a result of this planarization process, the soft magnetic part 43a has a top surface generally flush with the top surface of the non-magnetic part 43b. The silicon nitride film 43-2 may be removed completely or may remain partly as a result of the planarization process.

Thus, according to the manufacturing process of the present modification, it becomes possible to form a generally trapezoidal soft magnetic part 43a by forming the opening 43c to have a generally trapezoidal form, by etching the non-magnetic layer 43-1 under the condition that the isotropic etching becomes predominant while using the silicon nitride film 43-2 as a mask, and by forming the soft magnetic part 43a in such a trapezoidal opening 43c.

Here, it should be noted that the silicon nitride film 43-2 can by replaced with other film as long as the film is a non-magnetic material showing etching selectively to the non-magnetic layer 43-1 at the time of etching of the non-magnetic layer 43-1.

Further, it is also possible to form the soft magnetic part 13a of generally rectangular shape shown in FIG. 3 by using the process and material of the non-magnetic layer of the present modification. In such a case, an anisotropic RIE process is used in the step of FIG. 8C.

SECOND EMBODIMENT

Next, a magnetic storage apparatus using the vertical magnetic recording medium of the previous embodiment will be explained as a second embodiment of the present invention.

Figure 9:
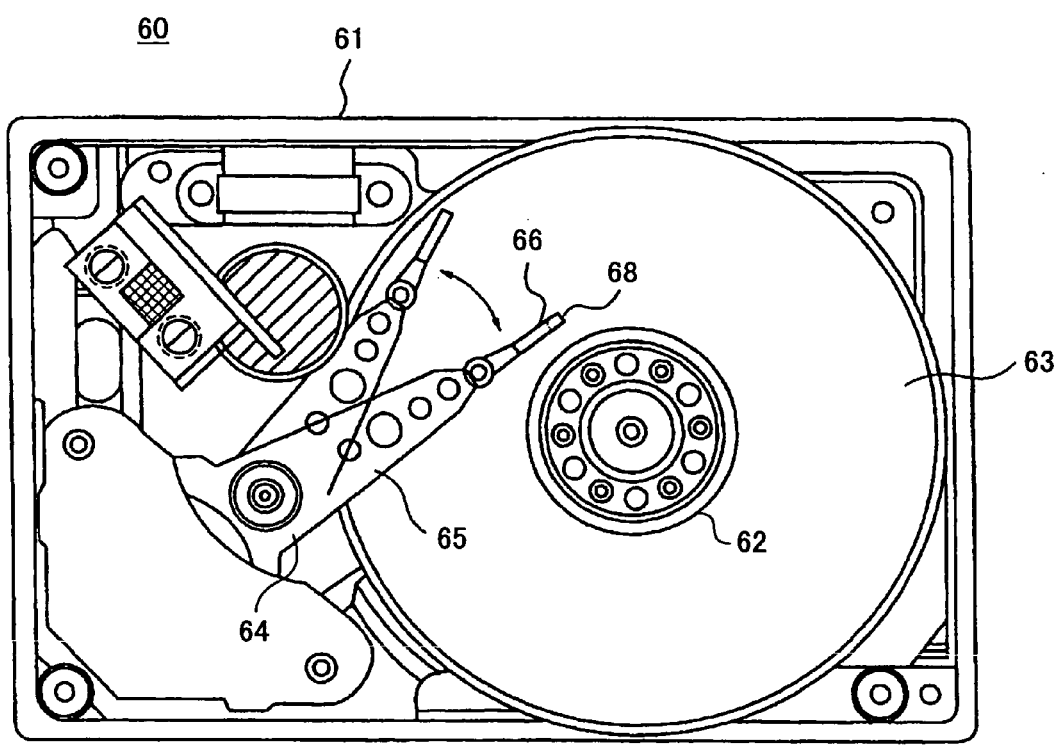
FIG. 9 is a diagram showing a part of the magnetic storage apparatus according to a second embodiment of the present invention.

FIG. 9 is a diagram showing a part of a magnetic storage apparatus 60 according to a second embodiment of the present invention.

Referring to the present invention, the magnetic storage apparatus 60 has a housing 61, in which there are accommodated a hub 62 driven by a spindle motor (not shown), a vertical magnetic recording medium 63 connected to the spindle motor and rotated therewith, an actuator unit 64, an arm 65 and a suspension 65 attached to the actuator unit 64 so as to be movable in the radial direction of the vertical magnetic recording medium 63, and a magnetic head 68 supported by the suspension 66.

Figure 10:
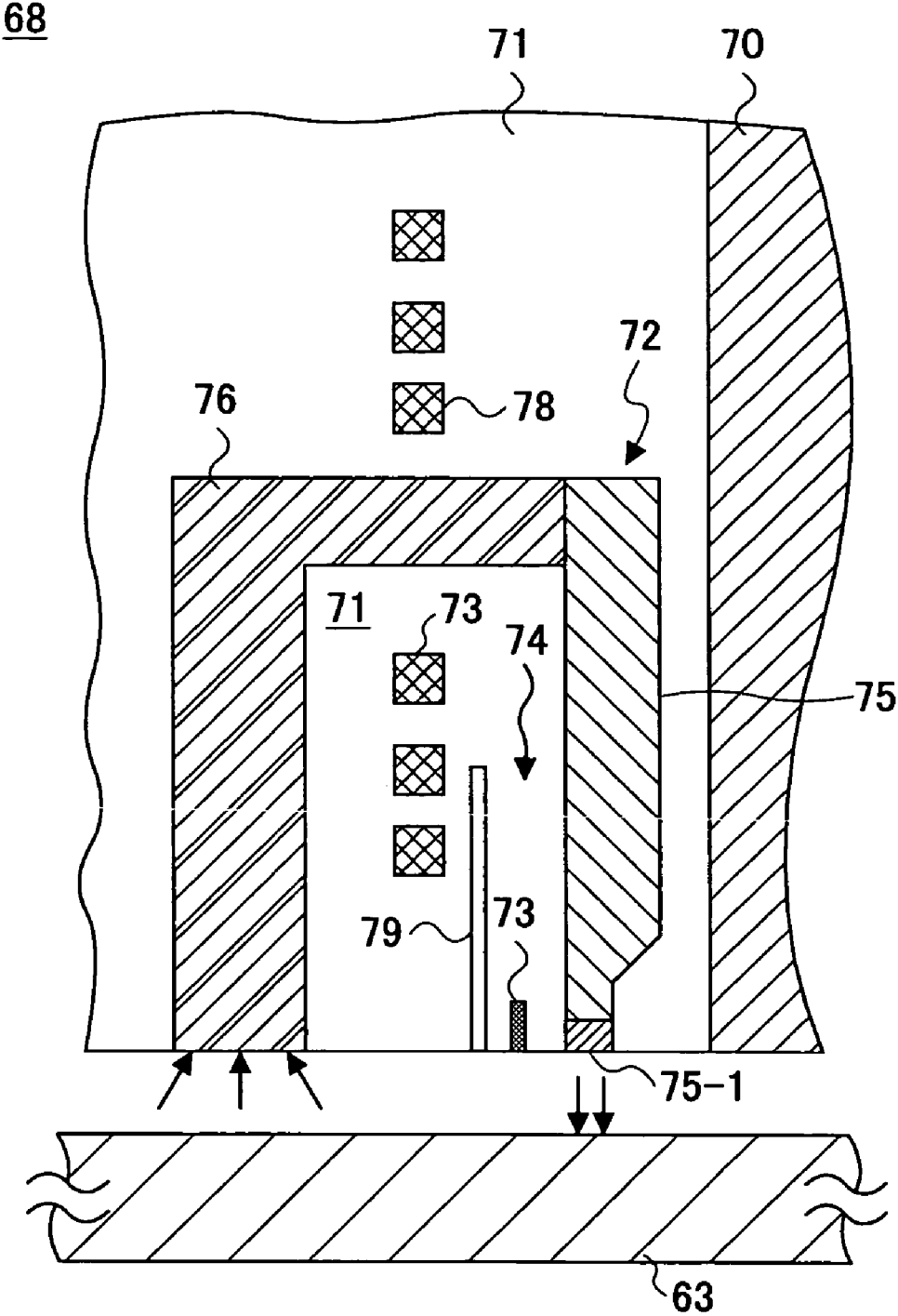
FIG. 10 is a cross-sectional diagram showing a schematic construction of a magnetic head.

FIG. 10 shows a schematic cross-sectional diagram of the magnetic head 68.

Referring to FIG. 10, the magnetic head 68 includes a slider 70 of AlTiC carrying thereon a single magnetic pole recording head 72 and a reproducing head 74 that uses a GMR (Giant Magneto-resistive) element 73, via an alumina insulation layer 71.

The single magnetic pole recording head 73 comprises a main magnetic pole 75 of a soft magnetic material applying a recording magnetic field to the vertical magnetic recording medium 63, a return yoke 76 connected magnetically to the main magnetic pole 75, and a recording coil 78 for inducing a recording magnetic field in the main magnetic pole 75 and the return yoke 76. On the other hand, the reproducing head 74 is formed on the main magnetic pole 75 as a bottom magnetic shield and includes the GMR element 73 thereon via the alumina insulation layer 71, wherein there is provided an upper magnetic shield 79 over the GMR element 73 via the alumina insulation layer 71. Thereby, the single magnetic pole recording head 72 applies a recording magnetic field perpendicularly to the vertical magnetic recording medium 63 from the main magnetic pole 75 and induces a magnetic spot in the vertical magnetic recording medium 63.

It should be noted the main magnetic pole 75 has a shape that decreases the cross-sectional area thereof toward a tip end part 75-1, and thus, it is possible to magnetize the vertical magnetic recording medium 63 having a large coercive force, by increasing the magnetic flux of the recording magnetic field. For the soft magnetic material constituting the tip end part 75-1 of the main magnetic pole 75, it is preferable to use a material of high saturation magnetic flux density such as 50 at % Ni-50 at % Fe, a FeCoNi alloy, FeCoNIB, FeCoAlO, and the like.

On the other hand, the reproducing head 74 obtains the information recorded on the vertical magnetic recording medium 63 by sensing the leakage magnetic field of the magnetization formed on the vertical magnetic recording medium 63 by way of detecting the change of resistance of the GMR element 73. In place of the GMR element 73, it is also possible to use a TMR (Ferromagnetic Tunnel Junction Magneto Resistive) element.

It should be noted that the magnetic storage apparatus 60 of the present embodiment has the feature thereof in the vertical magnetic recording medium 63. More specifically, the magnetic storage apparatus 60 uses a vertical magnetic recording medium of any of the first embodiment or the first or second embodiment thereof for the vertical magnetic recording medium 63.

Figure 11:
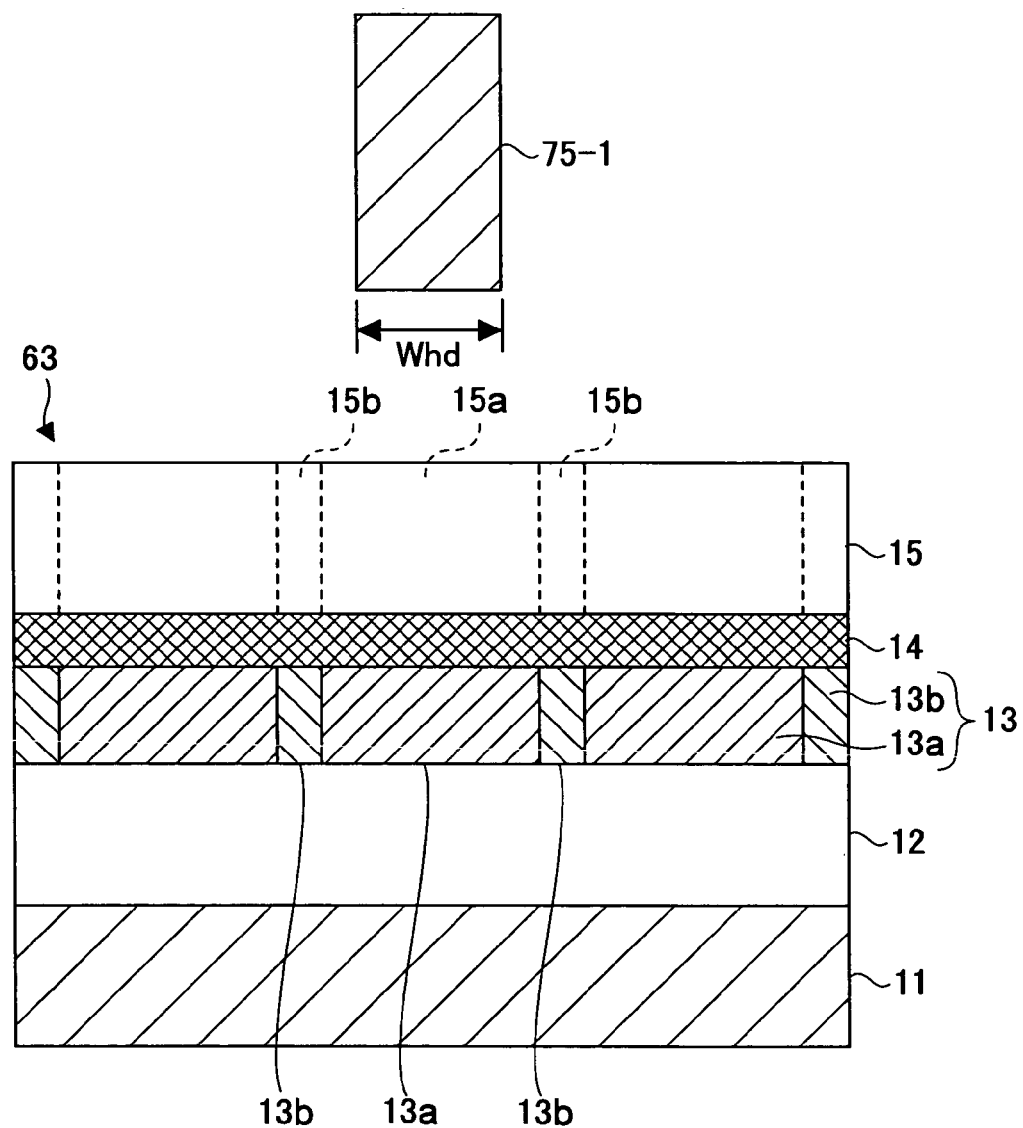
FIG. 11 is a diagram showing the recording process.

FIG. 11 is a diagram explaining the playback process of information in the magnetic storage apparatus of the present embodiment, wherein it should be noted that FIG. 11 shows the cross-sectional view of the vertical magnetic recording medium 63 and also the magnetic head taken so as to cross the tracks.

In the description hereinafter, the explanation will be made for the ease of using the vertical magnetic recording medium 10 of the first embodiment for the vertical magnetic recording medium 63. In the description hereinafter, it should be further noted that explanation is made for the case the magnetic flux flows from the recording head into the soft magnetic backing layer. While there occurs the case of reverse magnetic flux flow, the description thereof will be omitted.

Referring to FIG. 11, a magnetic flux of the recording magnetic field exits from the tip end part 75-1 of the main magnetic pole 75 of the recording head 74 at the time of the magnetic recording, wherein the magnetic flux thus exited flows into the soft magnetic part 13a and further into the soft magnetic backing layer 12 through the recording layer 15. Thereby, the recording layer 15 undergoes magnetization and there is formed a track region 15a as represented in FIG. 11. Thereby, it should be noted that the magnetic flux of the recording magnetic field is guided by the soft magnetic part 13a to the soft magnetic backing layer 12, and thus, the track region 15a is formed always over the soft magnetic part 13a, even in the case the tip end part 75-1 of the main magnetic pole 75 is offset laterally at the time of the magnetic recording. Further, because the recording layer 15 is formed uniformly in the vertical magnetic recording medium 63, there occurs no change of reproduced output at the time of playback of the information, even when the track region 15a is offset slightly and magnetization has invaded into the inter-track region 15b. Thereby, there occurs no increase of medium noise and decrease of the S/N ratio is avoided.

Further, there occurs no increase of medium noise, even when the magnetic pole width Whd at the tip end part 75-1 of the main magnetic pole 75 has increased beyond a predetermined width because of the same reason noted above. Thereby, the tolerance of manufacture of the magnetic head 74 is increased with regard to the magnetic pole width Whd, and the yield of production of the magnetic storage apparatus 60 is improved.

Further, it should be noted that the fundamental construction of the magnetic storage apparatus 60 of the present embodiment is not limited to the one shown in FIGS. 9 and 10. Further, the magnetic head 68 is not limited to the one explained above but any known magnetic head can be used. Further, the magnetic recording medium 63 of the present invention is not limited to a magnetic disk but may be a magnetic tape.

According to the present embodiment, the magnetic storage apparatus 60 uses the vertical magnetic recording medium 63 that includes therein the magnetic flux confinement layer 13 for increasing the recording magnetic field by confining the magnetic flux of the recording magnetic field. Further, the recording layer 15 is formed uniformly over the intermediate layer 14 covering the magnetic flux confinement layer 13. Thus, the problem of side erasing or side writing is suppressed, and the medium noise can be reduced. As a result, a magnetic storage apparatus capable of high density recording is realized.

Further, the present invention is by no means limited to the embodiments described heretofore, but various variations and modifications may be made without departing from the scope of the present invention.

For example, the present invention is not limited to the magnetic disk. The magnetic disk has been explained merely as an example of the vertical magnetic recording medium, and the present invention can achieve similar results as explained with reference to the foregoing embodiments even in the case the vertical magnetic recording medium is formed on a tape substrate of a polyimide tape in the form of a magnetic tape.

Further, it is possible to combine the first modification and the second modification of the first embodiment in the vertical magnetic storage medium.

What is claimed is:

1. A vertical magnetic recording medium having a recording layer including a track region recorded with information by a magnetic head and an inter-track region separating said track region from an adjacent track region offset in position from said track region in a width direction thereof, said track region and said inter-track region being formed magnetically in said magnetic recording layer, said magnetic recording medium comprising:

a substrate;
a soft magnetic backing layer formed on said substrate;
a magnetic flux confinement layer formed on said soft magnetic backing layer;
an intermediate layer formed on said magnetic flux confinement layer; and
a recording layer of a vertical magnetization film formed on said intermediate layer,
wherein said magnetic flux confinement layer comprises a soft magnetic part formed along said track region and a non-magnetic part formed between said track region and said adjacent track region,
said intermediate layer comprises a non-magnetic material of an amorphous material or microcrystalline material and is formed so as to cover a surface of said soft magnetic parts and said non-magnetic parts, and
said soft magnetic part of said magnetic flux confinement layer comprises a soft magnetic material having a higher magnetic permeability than a soft magnetic material forming said soft magnetic backing layer.

2. The vertical magnetic recording medium as claimed in claim 1, wherein said vertical magnetic recording medium is a magnetic disk, and
wherein said soft magnetic part and said non-magnetic part are formed respectively in a concentric pattern having a center generally coincident with a center of said magnetic disk, said soft magnetic part and said non-magnetic part are disposed alternately in a radial direction of said magnetic disk.

3. The vertical magnetic recording medium as claimed in claim 1, wherein said intermediate layer is formed of a material selected from the group consisting of $SiO_2$, $Al_2O_3$, $TiO_2$, TiC, C, and a hydrogenated carbon.

4. The vertical magnetic recording medium as claimed in claim 1, wherein said intermediate layer comprises a seed layer of an amorphous material, an underground layer of a soft magnetic material, and a non-magnetic metal intermediate layer formed of a material selected from the group consisting of Co, Cr, Ru, Re, Hf and an alloy thereof.

5. The vertical magnetic recording medium as claimed in claim 1, wherein said non-magnetic part of said magnetic flux confinement layer comprises a resin material.

6. The vertical magnetic recording medium as claimed in claim 5, wherein said resin material is formed of any of a thermoplastic resin material and a photosensitive resin material.

7. The vertical magnetic recording medium as claimed in claim 1, wherein said soft magnetic part has a lateral size, taken in a direction so as to cross plural tracks, such that said lateral size at a bottom surface of said soft magnetic part is smaller than said lateral size at a top surface of said soft magnetic part.

8. The vertical magnetic recording medium as claimed in claim 1, further comprising another intermediate layer of a non-magnetic material between said soft magnetic backing layer and said magnetic flux confinement layer.

9. A magnetic storage apparatus, comprising:
  a recording and playback part having a magnetic head; and
  a vertical magnetic recording medium having a recording layer including a track region recorded with information by a magnetic head and an inter-track region separating said track region from an adjacent track region offset in position from said track region in a width direction thereof, said track region and said inter-track region being formed magnetically in said magnetic recording layer, said magnetic recording medium comprising:
  a substrate;
  a soft magnetic backing layer formed on said substrate;
  a magnetic flux confinement layer formed on said soft magnetic backing layer;
  an intermediate layer formed on said magnetic flux confinement layer; and
  a recording layer of a vertical magnetization film formed on said intermediate layer,
  wherein said magnetic flux confinement layer comprises a soft magnetic part formed along said track region and a non-magnetic part formed between said track region and said adjacent track region,
  said intermediate layer comprises a non-magnetic material of an amorphous material or microcrystalline material and is formed so as to cover a surface of said soft magnetic parts and said non-magnetic parts, and
  said soft magnetic part of said magnetic flux confinement layer comprises a soft magnetic material having a higher magnetic permeability than a soft magnetic material forming said soft magnetic backing layer.

* * * * *